United States Patent [19]
Antonov et al.

[11] Patent Number: 5,001,691
[45] Date of Patent: Mar. 19, 1991

[54] HIGH DENSITY OPTICAL STORAGE DEVICE

[76] Inventors: Alexandr A. Antonov, prospekt Vernadskogo, 85, kv.64; Vyacheslav V. Petrov, ulitsa Montazhnikov, 104, both of Kiev, U.S.S.R.

[21] Appl. No.: 266,629
[22] PCT Filed: Dec. 14, 1987
[86] PCT No.: PCT/SU87/00143
§ 371 Date: Aug. 12, 1988
§ 102(e) Date: Aug. 12, 1988
[87] PCT Pub. No.: WO88/04818
PCT Pub. Date: Jun. 30, 1988

[30] Foreign Application Priority Data
Dec. 15, 1986 [SU] U.S.S.R. .................. 4157160

[51] Int. Cl.⁵ .................................. G11B 7/00
[52] U.S. Cl. .................................. 369/44.11
[58] Field of Search ............... 358/342; 369/43-47, 369/176, 179, 180, 258, 260, 261, 272, 273, 44.11; 360/102, 103, 132, 133

[56] References Cited
U.S. PATENT DOCUMENTS

| | | | |
|---|---|---|---|
| 3,894,180 | 7/1975 | Canino | 360/102 X |
| 3,992,576 | 11/1976 | Sugiura | 360/103 X |
| 4,006,294 | 2/1977 | Canino | 360/103 X |
| 4,094,010 | 6/1978 | Pepperl et al. | 365/215 |
| 4,404,571 | 9/1983 | Kitamura | 346/108 |
| 4,423,426 | 12/1983 | Kitamura | 346/108 |

FOREIGN PATENT DOCUMENTS
2522405 12/1976 Fed. Rep. of Germany.

Primary Examiner—Robert L. Richardson
Attorney, Agent, or Firm—Lilling and Lilling

[57] ABSTRACT

An optical storage device has an optical information carrier placed in a container filled with an immersion fluid, at least two stationary optical elements disposed on transparent portions of the walls of said container, and associated with optical heads each head having a source of modulated coherent radiation, a movable optical element, a beam splitter, and a photodetector. The optical storage device is linked with an external information computer system by means of a control unit connected to the photodetectors and sources of modulated coherent radiation. Each photodetector is connected to an autofocusing unit whose output is kinematically coupled with the movable optical element, while one of the photodetectors is connected to a track switching unit connected to a track tracing unit. The control unit is connected to the track switching unit and the track tracing unit is connected to an information addressing unit kinematically connected with the optical information carrier.

5 Claims, 9 Drawing Sheets

HIGH DENSITY OPTICAL STORAGE DEVICE

BACKGROUND OF THE INVENTION

1. Field of the Invention

This invention relates to information recording and reading techniques using modulated electromagnetic beam effect, wherein the read-write head and optical information carrier are displaced in relation to each other.

2. Description of the Related Art

Known in the art is an optical storage device (U.S. Pat. No. 4,404,571) employing a cylindrical information carrier. This known optical storage device has a very low density of information recording, since it uses only one optical head and has intervals between tracks.

The closest prior art, both technically and by the effect obtained, is an optical storage device (DE, A, 2 522 405) comprising an optical information carrier having reference tracks on the recording coating thereof, at least two optical heads which are optically connected with said optical information carrier, each said optical head being made of several optically connected elements, including a source of modulated coherent radiation, a movable optical element, a beam splitter, a photodetector having its first output connected to a repective input of an external control device, at least two autofocusing units, each having its input connected to a second output of the photodetector of a respective optical head, while the output of each autofocusing unit is kinematically connected to a movable optical element of its optical head, at least one tracking unit made as a disc, having its input connected to a third output of the photodetector.

This optical storage device is deficient in that its information recording density is insufficient because it is equipped with an inadequate tracking system which provides tracking of information tracks on the entire surface of the recording coating of the optical information carrier.

SUMMARY OF THE INVENTION

The invention is to provide an optical storage device in which a larger part of the recording coating of the optical information carrier is made free from reference tracks and record information tracks instead in order to make the density of recording on the optical information carrier much higher.

The invention consists of an optical storage device comprising an optical information carrier having reference tracks on its recording coating, and at least two optical heads optically connected to the optical information carrier. Each such optical head comprising several optically connected elements arranged one after another, including a source of modulated coherent radiation, a movable optical element, a beam splitter, a photodetector having its first output connected to a respective signal input of a control unit coupled to a data trunk line, whose signal outputs are connected to inputs of sources of modulated coherent radiation of respective optical heads. The invention further comprises at least two autofocusing units, each having its input connected to a second output of the photodetector of a respective optical head, while the output of each autofocusing unit is kinematically connected with a movable optical element of its optical head. At least one unit for tracing a track on the optical information carrier, which has its input electrically connected to a third output of a photodetector. The invention also comprises a track switching unit inserted between the input of the track tracing unit and the third output of the photodetector whose fourth output is connected to a second input of the track switching unit whose third input is connected to a first address output of the control unit. An information addressing unit 13 kinematically connected with the optical information carrier and has its first input connected to a second adress output of the control unit, while its second input is connected to the output of the track tracing unit. There is provided an optical information carrier placed in a container filled with an immersion fluid and having transparent parts in the walls thereof, which are located opposite optical heads, a stationary optical element being placed on each such transparent part, the reference tracks on the recording coating of the optical information carrier being provided only on a part of this recording coating, which is located beneath a stationary optical element linked with an optical head of the photodetector connected to the tracing unit.

It is advisable that the optical storage device should comprise additional track tracing units whose number is less by one than the number of optical heads, the output of each additional track tracing unit being kinematically connected with an additional input of a movable optical element of its optical head, while the input thereof is connected to the third output of the photodetector of its optical head.

It is preferable that an optical storage device uses a tubular optical information carrier comprising a substrate and a recording coating applied on the surface of this substrate.

It is possible that, in an optical storage device, the track switching unit should comprise a monostable multivibrator and a T-flip-flop whose input should be joined and connected to a first output of a control unit; first and second AND circuits having their first inputs connected to a first output of the monostable multivibrator and their second inputs connected, respectively, to the first and second outputs of the T-flip-flop; a first analog switch, a second analog switch, and a third analog switch, a control input of the first analog switch should be connected to the output of the first AND circuit, a control input of the second analog switch should be connected to the second output of the monostable multivibrator, and a control input of the third analog switch should be connected to the output of the second AND circuit, a signal input of the first analog switch should be connected to the third output of the photodetector which is a part of the optical head linked with a portion of the recording coating of the optical information carrier, which has reference tracks, a signal input of the second analong switch should be connected to a fourth output of this photodetector; an analog inverter having its input connected to the third output of the same photodetector, while the output thereof is connected to the signal input of the third analog switch; and an analog adder having its first, second and third inputs connected to outputs of the first, second, and third analog switches, and having its output connected to the track tracing unit thereof.

It is also possible that the track switching unit should comprise a first monostable multivibrator having its input connected, via a first communication wire, to a first output of the control unit; a second monostable multivibrator having its input connected, via a second communication wire, to the first output of the control unit; an RS-flip-flop and a first OR circuit having its two inputs connected to the first and second communication wires of the control unit; a T-flip-flop having its input connected to the output of the first OR circuit; first, second, third, fourth, fifth, sixth, seventh, and eight AND circuits, three inputs of the first AND circuit are connected to the first output of the RS-flip-flop, the second output of the T-flip-flop, and the second output of the second monostable multivibrator, three inputs of the second AND circuit are connected to the first output of the RS-flip-flop, the first output of the T-flip-flop, and the first output of the second monostable multivibrator, three inputs of the third AND circuit are connected to the first output of the RS-flip-flop, the first output of the T-flip-flop, and the second output of the second monostable multivibrator, three inputs of the fourth AND circuit are connected to the first output of the RS-flip-flop, the second output of the T-flip-flop, and the first output of the second monostable multivibrator, three inputs of the fifth AND circuit are connected to the second output of the RS-flip-flop, the second output of the T-flip-flop, and the second output of the first monostable multivibrator, three inputs of the sixth AND circuit are connected to the second output of the RS-flip-flop, the second output of the T-flip-flop, and the first output of the first monostable multivibrator, three inputs of the seventh AND circuit are connected to the second output of the RS-flip-flop, the first output of the T-flip-flop, and the second output of the first monostable multivibrator, three inputs of the eighth AND circuit are connected to the second output of the RS-flip-flop, the first output of the T-flip-flop, and the first output of the first monostable multivibrator; a second OR circuit having two inputs thereof connected to the outputs of the first and fifth AND circuits; a third OR circuit having its two inputs connected to outputs of the second and sixth AND circuits; a fourth OR circuit having its two inputs connected to outputs of the third and seventh AND circuits; a fifth OR circuit having its two inputs connected to outputs of the fourth and eighth AND circuits; first, second, third, and fourth analog switches having their control inputs connected, respectively, to outputs of the second, third, fourth, and fifth OR circuits, the signal input of the first analog switch is connectdd to the third output of the photodetector which is a part of the optical head linked with a portion of the recording coating on the optical information carrier, which has reference tracks, the signal input of the second analog switch is connected to the fourth output of the same photodetector, first and second analog inverters having their inputs connected, respectively, to the third and fourth outputs of the same photodetector and their outputs connected, respectively, to the signal inputs of the third and fourth analog switches; and an analog adder having its four inputs connected to outputs of the first, second, third, and fourth analog switches and its output connected to the track tracing unit.

This invention makes it possible to achieve a higher surface density of information recording in a multi-head optical storage device wherein positioning is effected by displacing an optical information carrier inside a container filled with an immersion fluid. This is achieved by making the larger portion of the recording coating on the optical information carrier free from reference tracks and using the portions of the recording coating made available in this manner to accommodate additional information tracks. This is also achieved by making information tracks narrower, which is made possible because the modulated coherent radiation can be more sharply focused by immersion optics.

BRIEF DESCRIPTION OF DRAWINGS

Given herein below is a detailed description of an embodiment of the invention, reference being made to the accompanying drawings, wherein:

FIGS. 10a, b, c, d, e, f, g show curves explanatory of the operation of a track switching unit, according to the invention;

FIGS. 12, a, c, d, e, f, g, h, i, k, l, m, n, p, q show curves explanatory of the operation of the track switching unit whose circuit is shown in FIG. 5, according to the invention.

BEST MODE FOR CARRYING OUT THE INVENTION

DESCRIPTION OF THE PREFERRED EMBODIMENT

An optical storage device (FIG. 1) comprises a tubular optical information carrier 1 made as a transparent cylindrical substrate 2 equipped with butt pressurizing covers 3. A recording coating 4 is applied on the internal surface of the cylindrical substrate 2 and is provided with a portion 5 having tracks made in advance. The optical information carrier 1 has a tubular shape and is confined in a tight (hermetically sealed) container 6 whose walls are provided with transparent portions 7 wherein stationary optical elements 8 (immersion lenses) are placed. The water-tight container 6 is filled with an immersion fluid 9, e.g. distilled water.

The optical storage device also comprises three optical heads 10, in a general case there may be at least two such optical heads. each optical head contains a source 11 of modulated coherent radiation, e.g. light, infrared, ultraviolet, a movable optical element 12, a beam splitter 13, and a photodetector 14. This photodetector 14 contains, although not shown in the drawings, photodiodes, preamplifiers, and elements for analog processing of source signals. The modulated coherent radiation sources 11 can be arranged one after another, in what is commonly referred to as a "laser line" or, as in FIG. 1, at regular intervals.

Figure 1:
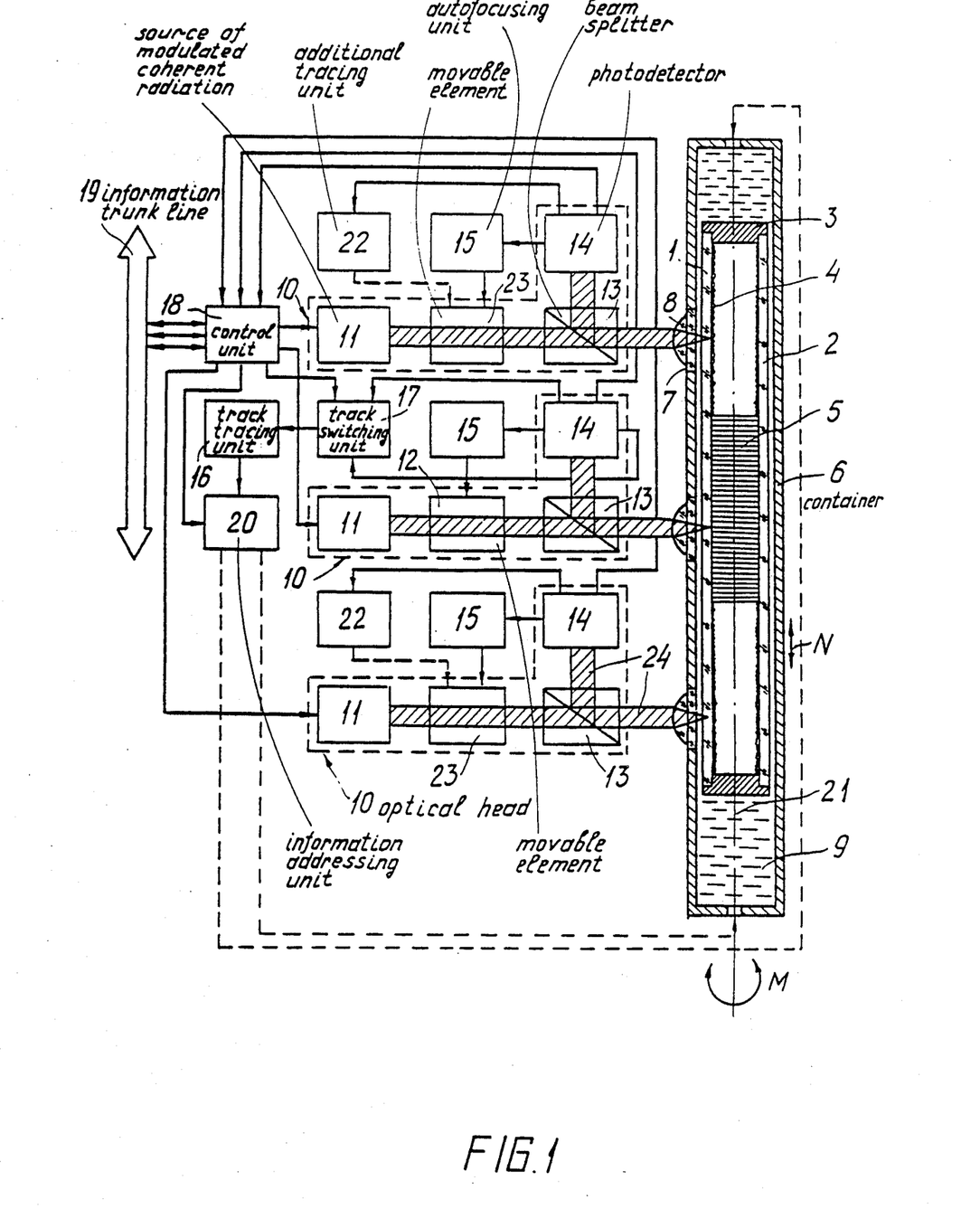
FIG.1 shows a block diagram of an optical storage device, according to the invention.

The optical storage device also comprises three autofocusing units 15, in a general case there may be two such units. Second outputs of photodetectors 14 of all optical heads 10 are connected to inputs of autofoucusing units 15. The output of each unit 15 is kinematically connected with the movable element 12 of its optical head 10.

The optical storage device comprises at least one track tracing unit 16 and a track switching unit 17. An input of the track tracing unit 16 is connected to an output of the track switching unit 17 whose first and second inputs are connected to third and fourth outputs of the photodetector 14 of the optical head 10. This optical head 10 in combination with the autofocusing unit 15, the track tracing unit 16, the track switching unit 17, and the stationary optical element 8 form the main information optoelectronic channel.

The optical storage device also comprises a control unit 18 connected, via an information trunk line 19, to other units of the computer information system (these unit are not shown in the drawings).

Signal inputs of the control unit 18 are connected to first outputs of photodetectors 14 of all optical heads 10, while all signal outputs of the control unit 18 are connected to inputs of the modulated coherent radiation sources 11 of all optical heads 10.

The address output of the control unit 18 is connected to a third input of the track switching unit 17 by a communication line comprising one or two signal wires.

The optical storage device comprises an information addressing unit 20 comprising, with reference to a tubular optical information carrier 1, a rotational drive and an axial drive (not shown in the drawings for simplicity). The addressing unit 20 is kinematically connected to the optical information carrier 1. The arrow N indicates the direction of displacement of the optical information carrier 1 along its axis 21. The arrow M indicates the direction of rotation of the optical information carrier 1 about its axis 21. The rotational drive may, for example, be an electrical drive, while the axial drive may, for example, be a hydraulic drive. These drives can be made by any conventional method.

The optical storage device also comprises additional tracing units 22 whose number is less by one than the number of optical heads 10. Each additional tracing unit 22 is a part of an additional optoelectronic channel comprising an optical head 10, a stationary optical element 8, and an autofocusing unit 15. The additional track tracing unit 22 is designed to trace slow displacements of tracks in relation to stationary optical elements, which are due to the temperature drift of tracks and the drift of the radiation pattern of the source of modulated coherent radiation. The input of each additional tracing unit 22 is connected to a third output of the photodetector 14 of the optical head 10 thereof. The output of each additional tracing unit 22 is kinematically connected with a movable optical element 23 which is a constituent part of its additional optoelectronic channel. The movable optical element 23 is intended, apart from autofocusing, for deflection of an electromagnetic beam 24 produced by the source 11 of modulated coherent radiation.

The optical storage device comprises an autofocusing system ensuring focusing the beam 24 on the recording coating 4 despite radial run-outs of the tubular optical carrier 1. This autofocusing system comprises an autofocusing unit 15, an optical head 10, a stationary optical element 8, and an optical information carrier 1.

The optical storage device also comprises a track tracing system ensuring, in the main optoelectronic channel, guidance of the beam 24 over the portion 5 of the recording coating 4 on the optical information carrier 1. This tracing system comprises a track tracing unit 16, a track switching unit 17, an information addressing unit 20, an optical information carrier 1, and an optical head 10.

In the additonal optoelectronic channel, the beam tracking system ensures that the beam 24 is guided outside the boundaries of the portion 5 of the recording coating 4 and comprises a track tracing unit 22, an optical head 10, a stationary optical element 8, and an optical informtion carrier 1.

Figure 2:
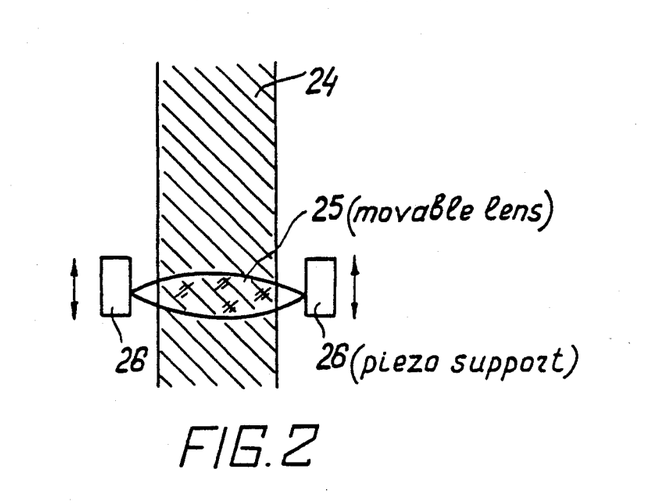
FIG. 2 shows a diagram of an embodiment of a movable optical element using a movable lens for autofocusing, according to the invention.

The movable optical element 12, shown in FIG. 2 where the path of the beam 24 is indicated, is made as a stationary lens 25 mounted in piezosupports 26.

Figure 3:
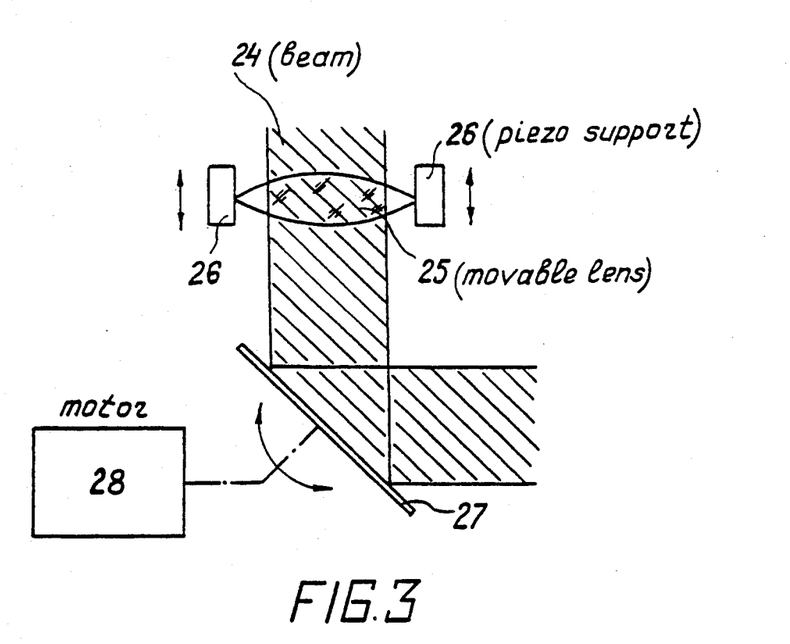
FIG. 3 shows a diagram of an embodiment of a movable optical element using a rotating mirror to trace a track and a movable lens for autofocusing, according to the invention.

The movable optical element 23 whose embodiment is shown in FIG. 3 is made as a movable lens 25 mounted in piezo supports 26 and a rotating mirror 27 controlled by a motor 28, through which the beam 24 passes from the source 11.

Figure 4:
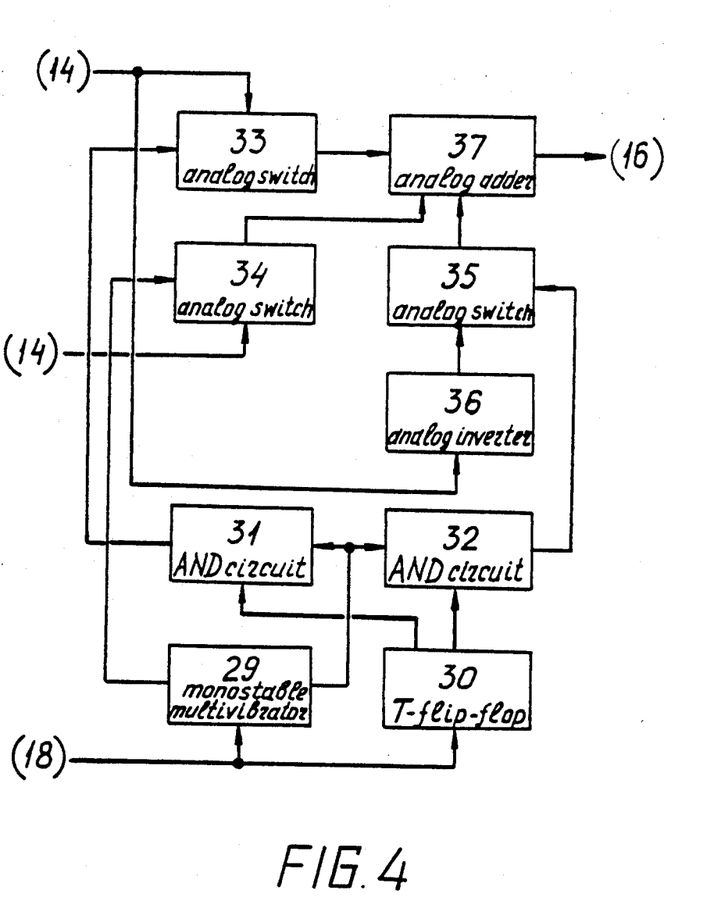
FIG. 4 shows a block diagram of a track switching unit with restricted movement of the electromagnetic beam, according to the invention.

The tracking switching unit 17, whose embodiment is shown in FIG. 4, comprises a monostable multivibrator 29 and a T-flip-flop 30 whose inputs are joined. These inputs are connected to an address output of the control unit 18 by a communication line which, in this embodiment of the track switching unit 17, contains only one signal wire.

A first output of the monostable multivibrator 29 is connected to first inputs of AND circuits 31 and 32 whose second inputs are connected, respectively, to the first and second outputs of the T-flip-flop 30. An output of the AND circuit 31 is connected to a control input of an analog switch 33. A control input of an analog switch 34 is connected to a second output of the monostable multivibrator 29. A control input of an analog switch 35 is connected to the output of the AND circuit 32. The signal input of the analog switch 33 is connected to a third output of the photodetector 14. The signal input of the analog switch 34 is connected to a fourth output of the photodetector 14. The signal input of the analog switch 35 is connected to a third output of the photodetector 14 via an analog inverter 36. Outputs of the analog switches 33, 34, and 35 are connected, respectively, to the first, second, and third inputs of an analog adder 37 whose output is connected to an input of the track tracing unit 16.

In an alternative embodiment of the track switching unit 17, the communication line between the address output of the control unit 18 and the third output of the track switching unit 17 comprises two signal wires. The address output of the control unit 18 is a multichannel output.

In another embodiment, the track switching unit 17 (FIG. 5) comprises a monostable multivibrator 38 having its input connected, via a first signal wire, to an address output of the control unit 18, and a second monostable multivibrator 39 having its input connected, via a second signal wire, to an address output of the control unit 18. It also comprises an OR circuit 40 and a RS-flip-flop 41 having two inputs connected, via two signal wires, to the first multichannel address output of the control unit 18.

Figure 5:
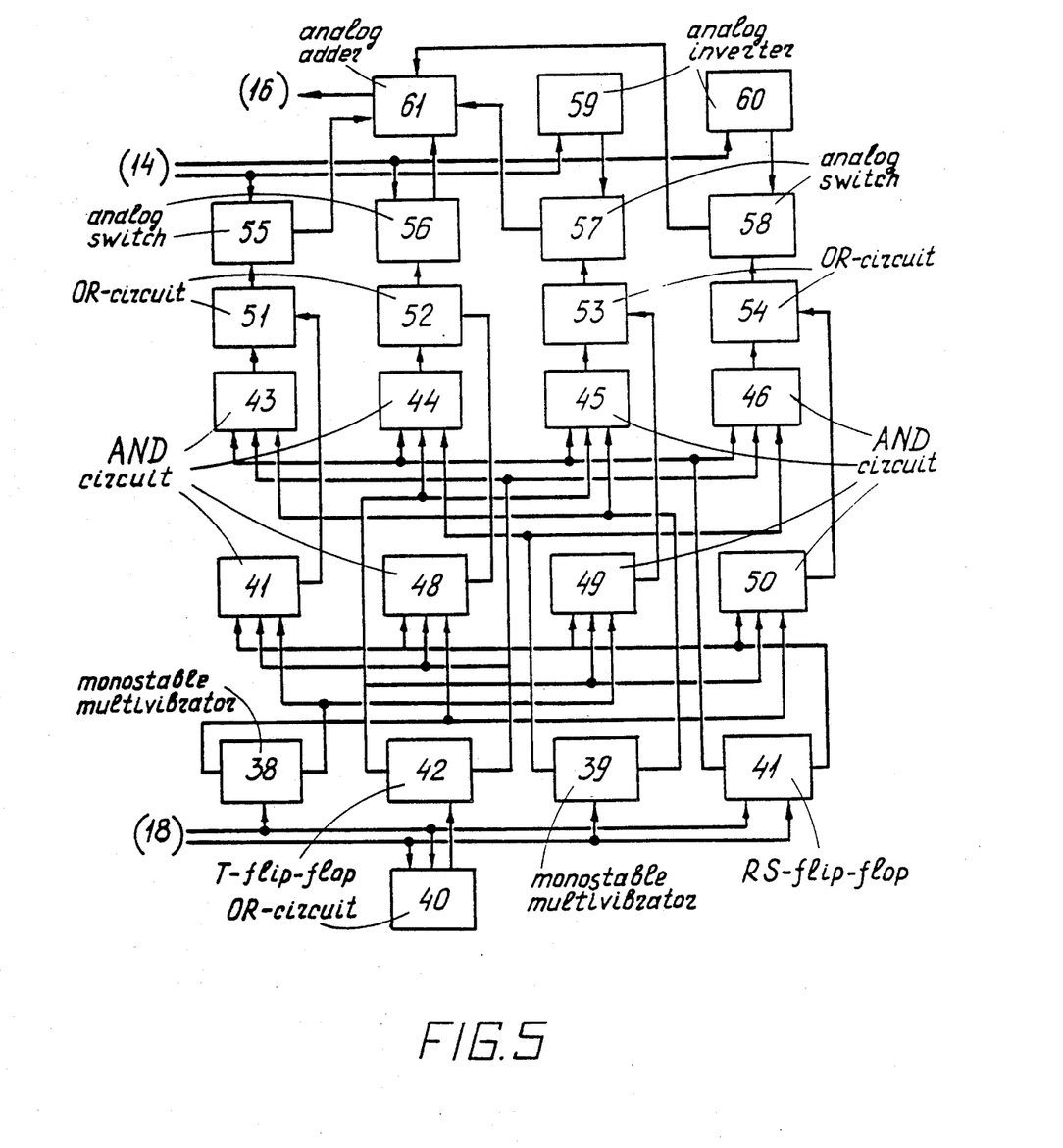
FIG. 5 shows a block diagram of a track switching unit with arbitrary movement of the electromagnetic beam, according to the invention.

The output of the first OR circuit 40 is connected to the input of a T-flip-flop 42. This track switching unit 17 also comprises AND circuits 43, 44, 45, 46, 47, 48, 49, and 50. Three inputs of the AND circuit 43 are connected to the first output of the RS-flip-flop 41, the second output of the T-flip-flop 42, and the second output of the monostable multivibrator 39. Three inputs of the AND circuit 44 are connected to the first output of the RS-flip-flop 41, the first output of the T-flip-flop 42, and the first output of the monostable multivibrator 39. Three inputs of the AND circuit 45 are connected to the first output of the RS-flip-flop 41, the first output of the T-flip-flop 42, and the second output of the monostable multivibrator 39. Three inputs of the AND circuit 46 are connected to the first output of the RS-flip-flop 41, the second output of the T-flip-flop 42, and the first output of the monostable multivibrator 39. Three inputs of the AND circuit 47 are connected to the second output of the RS-flip-flop 41, the second output of the T-flip-flop 42, and the second output of the monostable multivibrator 38. Three inputs of the AND circuit 48 are connected to the second output of the RS-flip-flop 41, the second output of the T-flip-flop 42, and the first output of the monostable multibrator 38. Three inputs of the AND circuit 49 are connected to the second output of the RS-flip-flop 41, the first output of the T-flip-flop 42, and the second output of the monostable multibrator 38. Three inputs of the AND circuit 50 are connected to the second output of the RS-flip-flop 41, the first output of the T-flip-flop 42, and the first output of the monostable multivibrator 38. Outputs of the AND circuits 43 and 47 are connected to two inputs of an OR circuit 51. Outputs of the AND circuits 44 and 48 are connected to two inputs of an OR circuit 52. Outputs of the AND circuits 45 and 49 are connected to two inputs of an OR circuit 53. Outputs of the AND circuits 46 and 50 are connected to two inputs of an OR circuit 54. Outputs of the OR circuits 51, 52, 53, and 54 are connected respectively to control inputs of analog switches 55, 56, 57, and 58. The signal input of the analog switch 55 is connected to the third output of the photodetector 14. The signal input of the analog switch 56 is connected to the fourth output of the photodetector 14. The signal input of the analog switch 57 is connected to the third output of the photodetector 14 via an analog inverter 59. The signal input of the analog switch 58 is connected, via an analog inverter 60, to the fourth output of the photodetector 14. Outputs of analog switches 55, 56, 57, and 58 are connected, respectively, to the first, second, third, and fourth inputs of an analog adder 61 whose output is connected to the track tracing unit 16.

Figure 6:
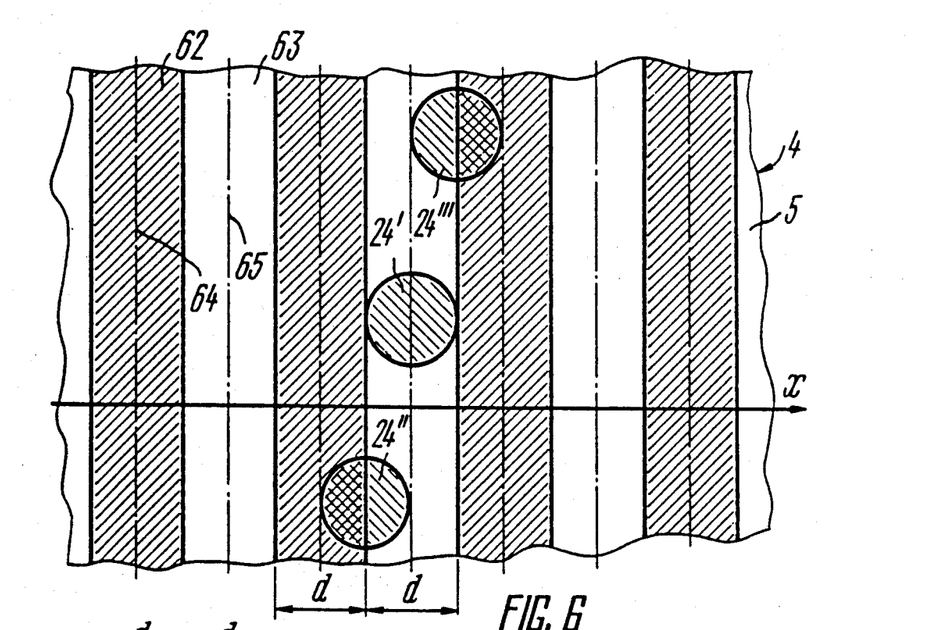
FIG. 6 shows an enlarged view of a fragment of a portion of the recording coating of the optical information carrier with beams projected thereon during tracing the longitudinal axis of an information track, according to the invention.

Referring to FIG. 6, a fragment of the portion 5 of the recording coating 4 of the optical information carrier 1 features reference tracks 62 and information tracks 63. In this embodiment of the device, the reference tracks 62 and information tracks 63 are shown, for simplicity, as having equal width "d". The direction of travel of the electromagnetic beam 24 acrross tracks 62 and 63 during tracing is indicated by "x". The reference and information tracks 62 and 63 have their respective longitudinal axes 64 and 65, respectively.

In the three-beam embodiment of the track tracing system (the diffraction grating of the optical heads 10 is not shown for simplicity), this fragment of the portion 5 of the recording coating 4 displays projections of three electromagnetic beams 24', 24", and 24''', obtained by splitting the source beam 24.

Position of projections of the beams 24', 24", and 24''' shown in FIG. 6 corresponds to tracing the axis 65 of the track 63.

Figure 7:
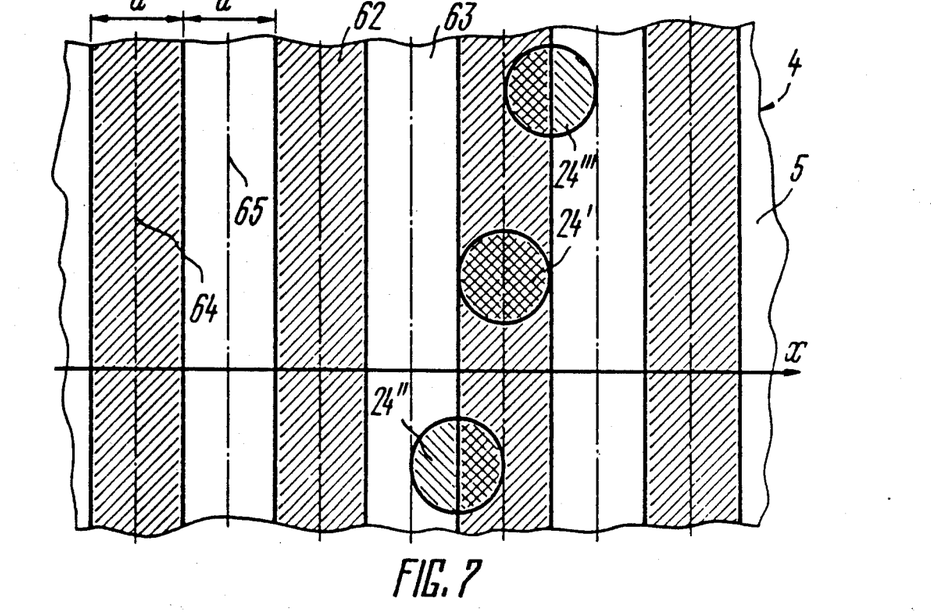
FIG. 7 shows en enlarged view of a fragment of a portion of a recording coating of the optical information carrier with beams projected thereon during tracing the longitudinal axis of a reference track, according to the invention.
Figure 8:
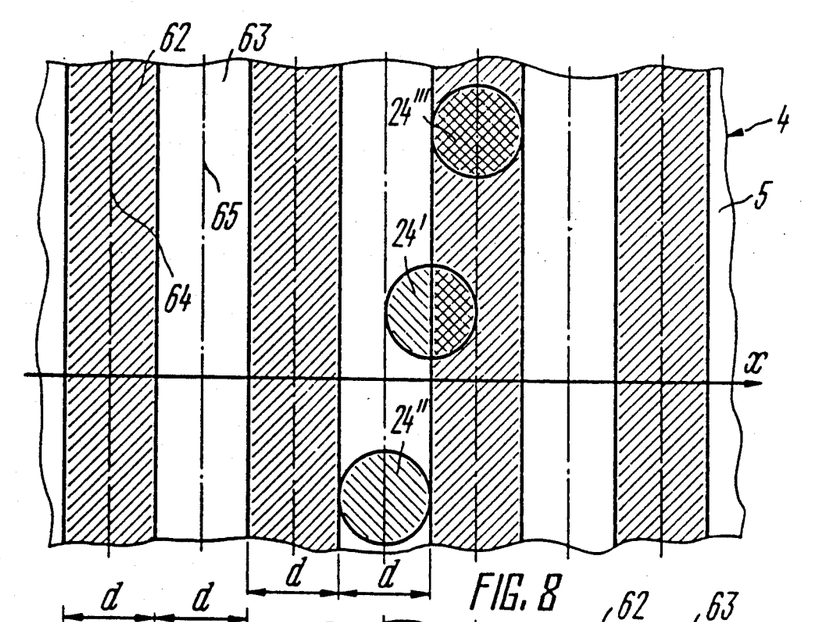
FIG. 8 shows an enlarged view of a fragment of a portion of a recording coating of the optical information carrier with beams projected thereon during tracing the right-hand edge of an information track, according to the invention.
Figure 9:
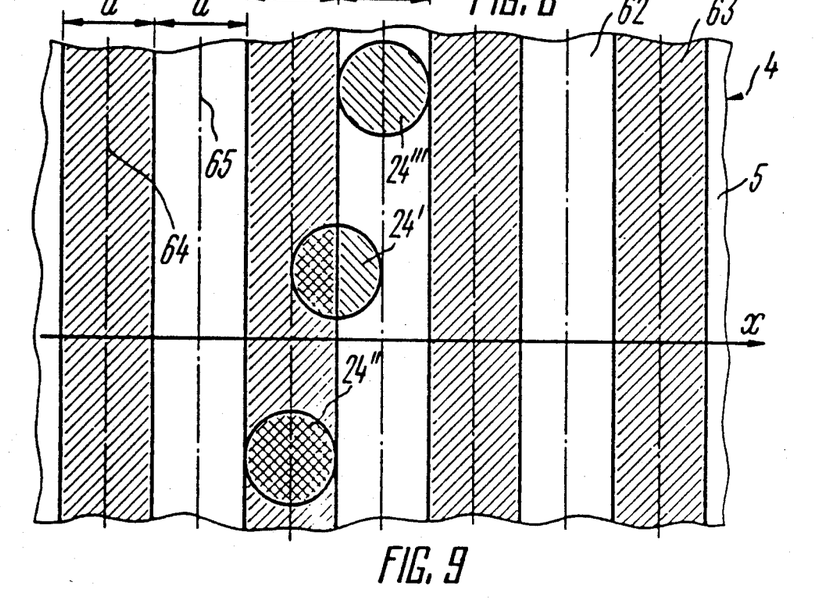
FIG.9 shows an enlarged view of a fragment of a portion of a recording coating of the optical information carrier with beams projected thereon during tracing the left-hand edge of an information track, according to the invention.

FIGS. 7, 8 and 9 show the same fragment of the portion 5 of the recording coating 4. Position of projections of the beams 24', 24", and 24''' in FIG. 7 corresponds to tracing the axis 64 of the reference track 62. Position of projections of the beams 24', 24", and 24''' in FIG. 8 corresponds to tracing the right hand edge of the information track 63, and in FIG. 9 tracing the left hand edge of the same track 63.

Figures 10A, 10B, 10C, 10D, 10E, 10F, 10G:
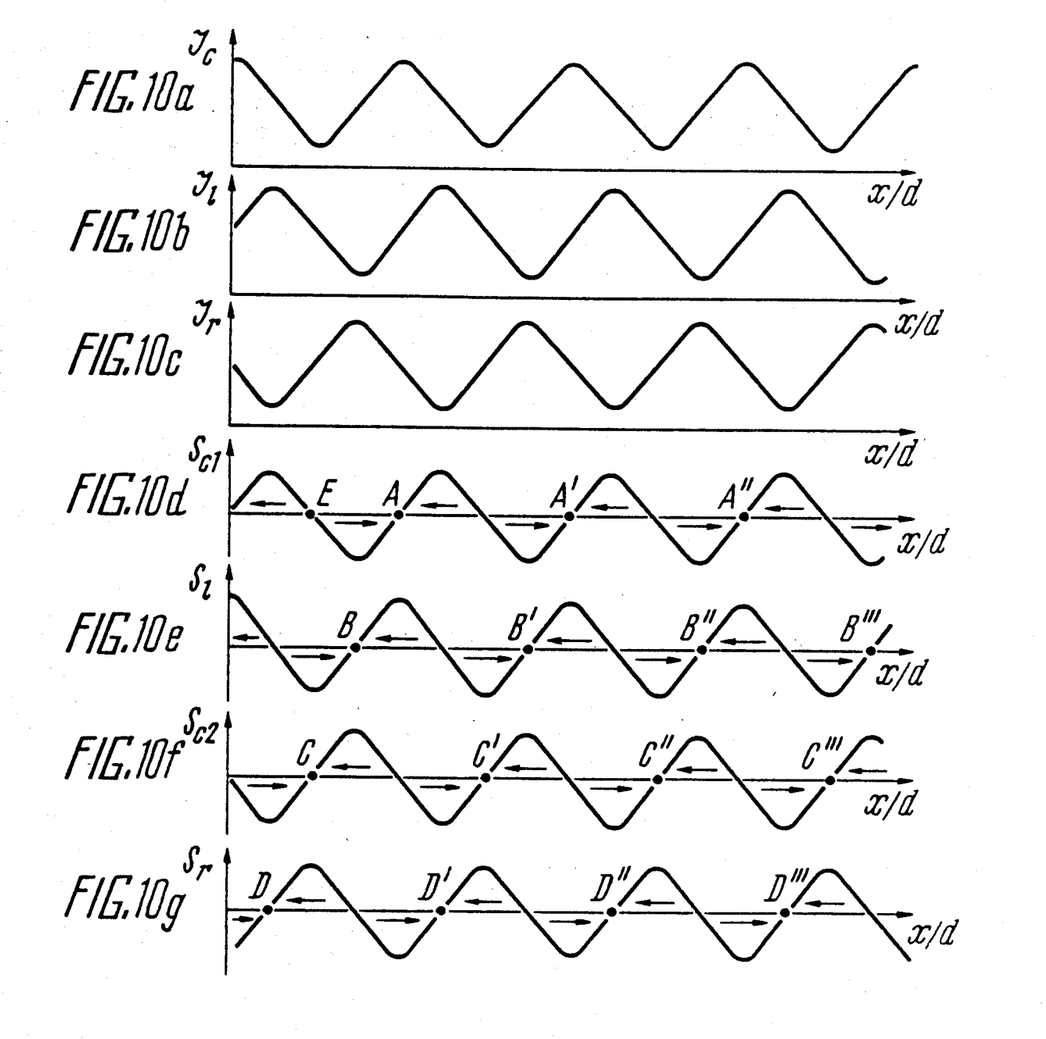
Figure 11A:
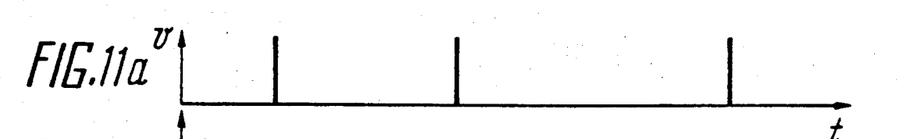
FIGS 11a, b, c, d, e, f, g show curves explanatory of the operation of the track switching unit whose circuit is shown in FIG. 4, according to the invention.
Figure 11B:
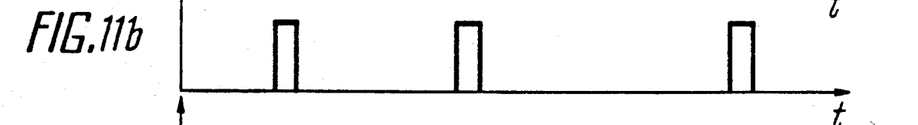

FIGS. 10a, b, c, d, e, f, g show waveforms or curves explanatory of the operation of the track switching unit 17. FIGS. 11a, b, c, d, e, f, g show curves explanatory of the operation of the track switching unit 17 whose circuit is shown in FIG. 4, while FIGS. 12a, b,, c, d, e, f, g, h, i, k, l, m, n, p, q show curves explanatory of the operation of the track switching unit 17 whose circuit is shown in FIG. 5.

The optical storage device operates as follows.

During recording, information to be stored is supplied from the control unit 18 to the inputs of three (or, generally, at least two) sources 11 (FIG. 1) of modulated coherent radiation. These sources, for example, may be gas or solid-state lasers equipped with optical modulators or semiconductor lasers. The input information modulates the intensity or some other parameter of the laser radiation by any known method. The modulated electromagnetic radiation is transmitted through respective optoelectronic channels to the recording coating 4 of the optical information carrier 1. The beam 24 (or several beams) reflected from the optical carrier 1 is transmitted via the beam splitter 13 to the photodetector 14. Radiation applied to the input of the photodetector 14 is converted by photodiodes, or some other light-signal converters, into photoelectric currents. These photocurrents are converted by analog circuits of the photodetector 14 into playback signals used, for example, for recording monitoring and error signals for autofocusing and tracking systems. These error signals are minimized in the autofocusing unit 15 and track tracing unit 16 respectively. A control signal obtained at the output of the track tracing unit 16 in the main optoelectronic channel is supplied to the information addressing unit 20 and corrects the axial play of the optical information carrier 1 for all optoelectronic channels. It is for this reason that the track tracing systems in additional optoelectronic chanels are only auxiliary systems to be used to correct for the temperature drift of tracks and the drift of the radiation pattern of the sources 11 of modulated coherent radiation.

As compared to the track tracing system of the main optoelectronic system, the track tracing systems of the additional channels have a narrower range and their feedback loop is connected through individual actuating movable optical elements 23. These elements 23 in the additional optoelectronic channels have two functions because they also receive error signals from the autofocusing units 15. In this embodiment of the optical storage device, reference tracks 62 (FIGS. 6–9) alternating with information tracks 63 are only available on the portion 5 of the recording coating 4 of the optical information carrier 1. This portion corresponds to the main optoelectronic channel. Other portions of the recording coating 4 can be used to record twice as much information tracks 63. This is achieved by shifting the optical information carrier 1 (FIG. 1) to a half-space equal to the width "d" of the tracks 63 (FIGS. 6–9) on the portion 5 of the recording coating 4 by means of the track switching unit 17. This track switching unit 17 is used in the main optoelectronic channel to trace the axis 65 of the information track 63 and, also, the axis 64 of the reference track 62.

Since the optical information carrier 1 is confined in a water-tight container 6 filled with the immersion fluid 9, the resolution can be made higher and some additional contribution can be achieved to making information recording more dense.

The information recorded in this manner on the optical carrier 1 can be stored for a long time and read many times over.

During reading, all sources 11 (FIG. 1) of modulated coherent radiation emit beams 24 of constant intensity. The autofocusing and tracking systems operate exactly as described above. Playback signals are produced in the photodetectors 14 and supplied to the control unit 18.

It is possible to use the herein disclosed optical storage device for simultaneous recording in some optoelectronic channels and reading in other channels.

The movable optical element 12 shown in FIG. 2 operates as follows.

The error signal from the autofocusing system is supplied to the piezosupports 26 resulting in axial displacement of the lens 25 and focusing the beam 24 on the recording coating 4 of the optical carrier 1.

The movable optical element 23 shown in FIG. 3 operates as follows.

When an error signal is supplied to the motor 28 available in the track tracing unit 22, the motor 28 changes the position of the rotating mirror 27 so that the center of the beam 24 is brought back to the axis 65 of the track 63. When the error signal of the autofocusing system is supplied to the piezosupports 26, the position of the lens 25 in relation to its axis is changed so that the beam 24 is focused on the recording coating 4 of the optical carrier 1.

The track switching unit 17 shown in FIG. 4 operates as follows. Referring to FIGS. 10a, 10b, and 10c, the initial optical signals obtained by, for example, a three-beam optical arrangement can be converted by the photodiodes (or some other light-to-signal converters) in the photodetectors 14 into photocurrent $I_c$ (FIG. 10a) corresponding to the central beam 24' (FIGS. 6–9), photocurrent $I_l$ (FIG. 10b) corresponding to the left beam 24'' (FIGS. 6–9), and photocurrent $I_r$ (FIG. 10c) corresponding to the right hand beam 24''' (FIGS. 6–9). When these beams 24', 24'', and 24''' are displaced across the reference and information tracks 62 and 63, that is in the direction of the axis "x", the magnitude of photocurrents $I_c$, $I_l$, $I_r$ varies as shown in FIGS. 10a, 10b, and 10c. The photocurrents $I_c$, $I_l$, $I_r$ (FIGS. 10a, 10b, 10c) can be converted by analog operations in the photodetectors 14 (FIG. 1) into tracing signals $S_{c1}$, $S_{c2}$, $S_l$, $S_r$ (FIGS. 10d, 10e, 10f, 10g). The signal $S_{c1}$ (FIG. 10d) tracing the axis 65 (FIG. 6) of the information track 63 can be obtained according to the expression $$S_{c1} = k_o \frac{I_l - I_r}{2}.$$

The signal $S_{c2}$ (FIG. 10f) for tracing the axis 64 (FIG. 7) of the reference track 62 can be obtained in accordance with the expression $$S_{c2} = K_o \frac{I_r - I_l}{2}.$$

The signal $S_l$ (FIG. 10e) for tracing the left hand edge of the information track 63 (FIG. 9) can be obtained in accordance with the expression $$S_l = k_o \left( I_c - \frac{I_l + I_r}{2} \right).$$

The signal $S_r$ (FIG. 10g) for tracing the right hand edge of the information track 63 (FIG. 8) can be obtained in accordance with the expression $$S_r = k_o \left( \frac{I_l + I_r}{2} - I_c \right),$$

where $k_o$ is the coefficient of proportionality.

The track tracing unit 16 (FIG. 1) responds to signals $S_{c1}$, $S_{c2}$, $S_l$ and $S_r$ by displacing the beams 24', 24'', and 24''' (FIGS. 6–9) across the reference and information tracks 62 and 63 in the directions indicated by arrows in FIGS. 10d, 10e, 10f, and 10g. It is clear from the comparison of the error signals $S_{c1}$, $S_{c2}$, $S_l$, $S_r$ and the direction of response thereto that some zero signals are stable (points A, A', ... in FIG. 10d, 1 B,B', ... in FIG. 10e, C, C', ... in FIG. 10f, D,D', ... in FIG. 10g), while other are unstable (for example E in FIG. 10d). This means that to switch over from tracing the axis 65 of the information track 63 (FIG. 6) to tracing the axis 64 of the reference track 62 (FIG. 7) or back, it is sufficient, as shown by the comparison of the tracing signals $S_{c1}$ and $S_{c2}$ to additionally invert the tracing signal $S_c$ in the track switching unit 17. But to provide a track switching unit 17 capable of reliably switching tracks in the desired manner, this is not enough because the beam can equally be switched to the left or right tracks adjoining the initial one. The track switching unit 17 should guarantee not only track switching, but also the direction of this switching operation. To this end, the track switching unit 17 is equipped with additional electrical units which are to ensure reliable tracing of the prescribed boundary between the information track 63 and the reference track 62 (FIGS. 8 and 9).

Figure 11C:
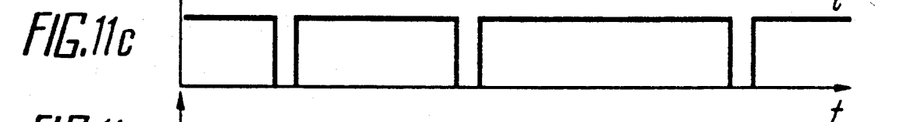
Figures 11D, 11E:
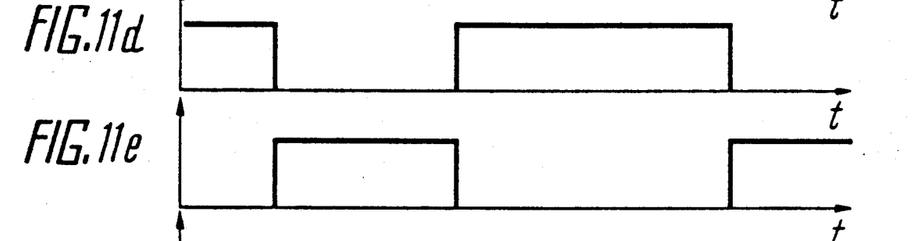
Figure 11F:
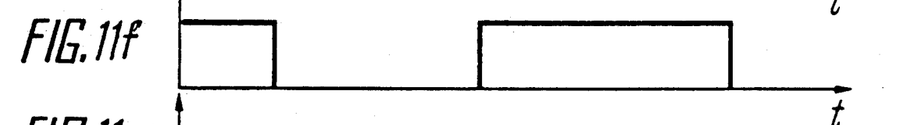
Figure 11G:
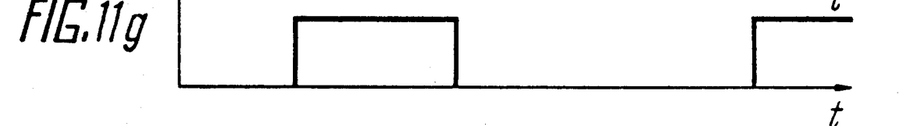

The above considerations dictated the development of the arrangement of the track switching unit 17 shown in FIG. 4. In this unit 17, a track switching pulse is supplied to the joint input of the monostable multivibrator 29 and the T-flip-flop 30 (FIG. 11a). Responding to this pulse, the monostable multivibrator 29 generates a pulse (FIGS. 11b, c) of the assigned transfer duration and the T-flip-flop 30 changes its state (FIGS. 11c and 11d). Pulses generated by the monostable multivibrator 29 (FIG. 11b) and T-flip-flop 30 (FIGS. 11d and 11e) are used by the AND circuit 31 and AND circuit 32 to produce pulses successively rendering conductive the first analog switch 33 (FIG. 11f), the second analog switch 34 (FIG. 11b), and the third analog switch 35 (FIG. 11g). In this manner we can achieve successive and stable tracking of the axis of the information track 63 (FIG. 6), its left hand edge (FIG. 9), and the axis 64 of the reference track 62 (FIG. 7), or vise versa. When a next track switching pulse (FIG. 11a) is applied to the input of the unit 17, the beam 24', is transferred in the direction opposite to the previous switching. This means, however, that this embodiment of the track switching unit 17 (FIGS. 6–9) cannot provide changes of tracks 62 and 63 in any direction.

Figures 12A, 12B, 12C, 12D:
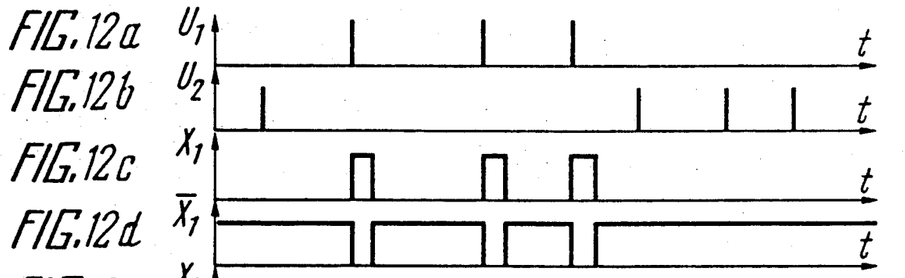
Figures 12E, 12F, 12G:
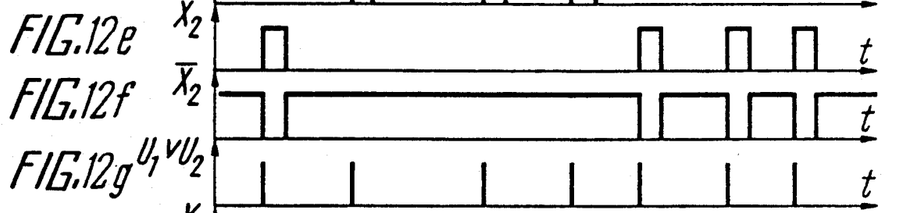
Figures 12H, 12I, 12K:
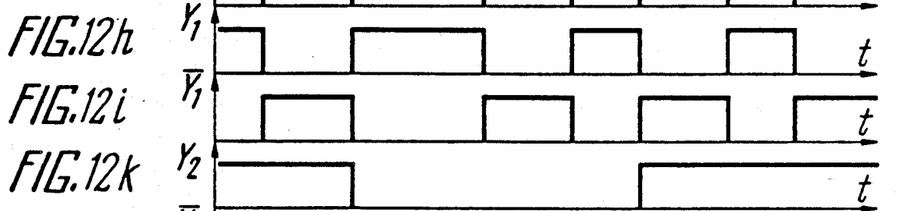
Figures 12L, 12M, 12N, 12P, 12Q:
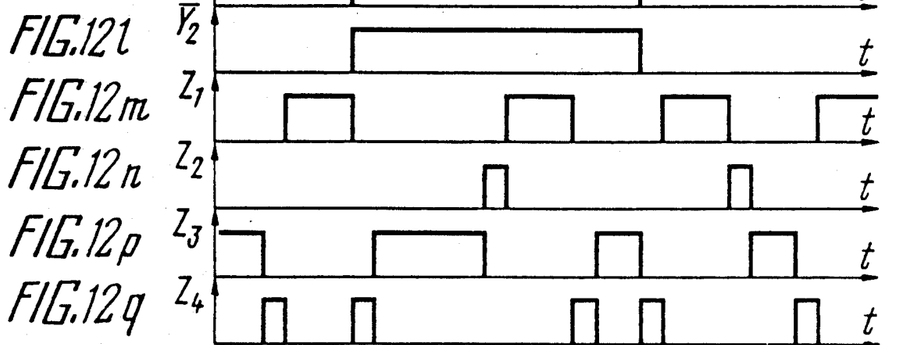

The track switching unit 17 shown in FIG. 5 also employs the above described principles, but is free from the above disadvantage. This unit 17 has two control inputs. One control input is connected to the first signal wire for the switch-to-the-right signal (FIG. 12a) and to the second signal wire for the switch-to-the-left signal (FIG. 12b). The left switch signal (FIG. 12b) can make, for example, the beam 24' move, depending on the initial position, from the axis 65 of the information track 63 (FIG. 6) to the left hand edge of the information track 63 (FIG. 9) and then to the axis 64 of the reference track 62 (FIG. 7), or from the axis 64 of the reference track 62 (FIG. 7) to the right hand edge of the information track 63 (FIG. 8) and then to the axis 65 of the information track 63 (FIG. 6). The right switch signal (FIG. 12a) can make the beam 24' move, depending on the initial position thereof, from the axis 65 of the information track 63 (FIG. 6) to the right hand edge of the information track 63 (FIG. 8) and further to the axis 64 of the reference track 62 (FIG. 7), or from the axis 64 of the reference track 62 (FIG. 7) to the left hand edge of the information track 63 (FIG. 9) and then to the axis 65 of the information track 63 (FIG. 7). This algorithm is realized in the track switching unit 17. Right switch signal pulses (FIG. 12a) are supplied from the address output of the control unit 18 via the first signal wire to the input of the monostable multivibrator 38, while left switch signal pulses (FIG. 12b) are supplied from the address output of the control unit 18 via the second signal wire to the input of the monostable multivibrator 39. In addition, both pulses (FIGS. 12a and 12b) are also supplied to two inputs of the OR circuit 40 and RS-flip-flop 41. Output pulses (FIG. 12g) of the OR circuit 40 are fed to the input of the T-flip-flop 42. Let us designate the signal on the first output of the monostable multivibrator 38 as $X_1$ (FIG. 12c) and the signal on the second output thereof as $\overline{X}_1$ (FIG. 12d). The signal on the first output of the monostable multivibrator 39 is designated as $X_2$ (FIG. 12e), while the signal on the second output thereof is $\overline{X}_2$ (FIG. 12f). The signal on the first output of the T-flip-flop 42 is $Y_1$ (FIG. 12h) and on the second output thereof—$\overline{Y}_1$ (FIG. 12i). The signal on the first output of the RS-flip-flop 41 is designated as $Y_2$ (FIG. 12k) and on the second output thereof as $\overline{Y}_2$ (FIG. 12l). Then the signal $Z_{11}$ fed to the first input of the OR circuit 51 is a conjunction of signals fed from the first output of the RS-flip-flop 41 (FIG. 12i), from the second output of the T-flip-flop 42 (FIG. 12k), and from the second output of the monostable multivibrator 39 (FIG. 12f)

$$Z_{11} = Y_2 \wedge \overline{Y}_1 \wedge \overline{X}_2$$

and is generated by the AND circuit 43 (FIG. 5).

The signal $Z_{12}$ fed to the second input of the OR circuit 51 is a conjunction of signals $\overline{Y}_2$ (FIG. 12l), $\overline{Y}_1$ (FIG. 12i) and $\overline{X}_1$ (FIG. 12d)

$$Z_{12} = \overline{Y}_2 \wedge \overline{Y}_1 \wedge \overline{X}_1$$

and is generated by the AND circuit 47 (FIG. 5).

Similar signals fed to the first and second inputs of the OR circuits 52, 53, or 54 are respectively equal to:

$$Z_{21} = Y_2 \wedge Y_1 \wedge X_2$$

$$Z_{22} = \overline{Y}_2 \wedge \overline{Y}_1 \wedge X_1$$

$$Z_{31} = Y_2 \wedge Y_1 \wedge \overline{X}_2$$

$$Z_{32} = \overline{Y}_2 \wedge Y_1 \wedge \overline{X}_1$$

$$Z_{41} = Y_2 \wedge \overline{Y}_1 \wedge X_2$$

$$Z_{42} = \overline{Y}_2 \wedge Y_1 \wedge Z_1$$

and are generated by the AND circuits 45, 46, 47, 48, 49, 50.

Pulses (FIGS. 12m, 12n, 12p, 12q) fed from the outputs of the OR circuits 51, 52, 53, and 54 to the control inputs of the analog switches 55, 56, 57, and 58 are equal to the following functions:

$$X_1 = Z_{11} \vee Z_{12}$$

$$Z_2 = Z_{21} \vee Z_{22}$$

$$Z_3 = Z_{31} \vee Z_{32}$$

$$Z_4 = Z_{41} \vee Z_{42}$$

Signals fed to the first and second inputs of the track switching unit 17 (FIG. 1) from the third and fourth outputs of the photodetector 14 of the main optoelectronic channel are therefore switched in the desired succession, thus maintaining the desired track switching law.

This invention makes it possible to achieve at least a two-fold increase in the recording density on an optical information carrier.

The present invention can be used as an external computer memory, e.g. in a personal computer. Such optical storage devices are advantageous in compilation of data-bases for multiple purposes.

We claim:

1. An optical storage device comprising: an optical information carrier having a recording coating and reference tracks on the recording coating; at least two optical heads optically communicating with the optical information carrier, each such optical head comprising several elements optically communicating and arranged one after another, including a source of modulated coherent radiation, a movable optical element, a beam splitter, and a photodetector; a control unit linked to an information trunk line and having signal outputs connected to inputs of the sources of modulated coherent radiation of respective optical heads, a first output of each photodetector being connected to a respective signal input of the control unit; at least two autofocusing units, an input of each autofocusing unit being connected to a second output of each photodetector of a respective optical head, an output of each autofocusing unit being kinematically linked with the movable optical element of its optical head; at least one unit to trace for tracing a track on the optical information carrier, having an input electrically connected to a third output of one of the photodetectors; characterized in that the device further comprises: a track switching unit having a plurality of inputs and an output, the output being connected to the input of the track tracing unit and the first input being connected to the third output of the photodetector, this photodetector having a fourth output connected to the second input of the track switching unit, the third input of the track switching unit being connected to a first address output of the control unit; an information addressing unit kinematically connected with the optical information carrier, a first input of the information addressing unit being connected to a second address output of the control unit, while a second input thereof is connected to an output of the track tracing unit; and a container filled with an immersion fluid in which the optical information carrier is placed, and featuring transparent portions in walls thereof, located opposite the optical heads, each transparent portion carrying a stationary optical element, the reference tracks on the recording coating of the optical information carrier occupying only a portion of this recording coating located under one stationary optical element and communicating with the optical head whose photodetector is connected to the track switching unit.

2. An optical storage device as claimed in claim 1, further comprising: additional track tracing units whose number is less by one than the number of optical heads, an output of each additional track tracing unit being kinematically connected with an additional input of the movable optical element of its optical head, the input of each additional track tracing unit being connected to the third output of the photodetector of respective optical heads.

3. An optical storage device as claimed in claim 1, wherein the optical information carrier is tubular in shape and contains a cylindrical substrate with a recording coating applied on the surface thereof.

4. An optical storage device as claimed in claim 3, wherein the track switching unit comprises: a monostable multivibrator having a first and a second output; a T-flip-flop having inputs and first and second outputs, the inputs being joined together and connected to a first output of the control unit; first and second AND circuits, each having a first input, second input, and an output, the first inputs being connected to the first output of the monostable multivibrator and the second inputs being connected to, respectively, the first and second outputs of the T-flip-flop; first, second and third analog switches, each having a control input, a signal input and an output, the control input of the first analog switch being connected to the output of the first AND circuit, the control input of the second analog switch being connected to the second output of the monostable multivibrator, the control input of the third analog switch being connected to the output of the second AND circuit, the signal input of the first analog switch being connected to the third output of the photodetector which is incorporated into the optical head and linked with the portion of the recording coating of the optical information carrier which has reference tracks, the signal input of the second analog switch being connected to the fourth output of the same photodetector; an analog inverter having an input connected to the third output of the same photodetector, the analog inverter also having an output connected to the signal input of the third analog switch; and an analog adder having first, second, and third inputs connected to outputs of the respective analog switches and having an output connected to the input of the track tracing unit.

5. An optical storage device as claimed in claim 3, wherein the track switching unit comprises a first monostable multivibrator having an input connected via a first signal wire to the first address output of the control unit; a second monostable multivibrator having an input connected via a second signal wire to the first address output of the control unit; a first OR circuit having two inputs and an output; an RS-flip-flop having two inputs, the inputs of the first OR circuit and RS-flip-flop being connected to the first and second signal wires of the control unit; a T-flip-flop having an input connected to the output of the first OR circuit; eight AND circuits, each having three inputs and an output, the three inputs of the first AND circuit being connected respectively to a first output of the RS-flip-flop a second output of the T-flip-flop, and a second output of the second monostable multivibrator; the three inputs of the second AND circuit being connected to the first output of the RS-flip-flop, a first output of the T-flip-flop, and a first output of the second monostable multivibrator; the three inputs of the third AND circuit being connected to the first output of the RS-flip-flop, the first output of the T-flip-flop, and the second output of the second monostable multi-vibrator; the three inputs of the fourth AND circuit being connected to the first output of the RS-flip-flop, the second output of the T-flip-flop, and the second output of the second monstable multivibrator; the three inputs of the fifth AND circuit being connected to a second output of the RS-flip-flop, the second output of the T-flip-flop, and a second output of the first monostable multivibrator; the three inputs of the sixth AND circuit being connected to the second output of the RS-flip-flop, the second output of the T-flip-flop, and a first output of the first monostable multivibrator; the three inputs of the seventh AND circuit being connected to the second output of the RS-flip-flop, the first output of the T-flip-flop, and the second output of the first monostable multivibrator; the three inputs of the eighth AND circuit being connected to the second output of the RS-flip-flop, the first output of the T-flip-flop, and the first output of the first monostable multivibrator; a second OR circuit having two inputs connected to the outputs of the first and fifth AND circuits; a third OR circuit having two inputs connected to the outputs of the second and sixth AND circuits; a fourth OR circuit having two inputs connected to the outputs of the third and seventh AND circuits; a fifth OR circuit having two inputs connected to the outputs of the fourth and eighth AND circuits; four analog switches having control inputs connected, respectively, to outputs of the second, third, fourth and fifth OR circuits, a signal input of the first analog switch being connected to the third output of the photodetector which is incorporated into the optical head and linked with the portion of the recording coating of the optical information carrier, which has reference tracks, a signal input of the second analog switch being connected to the fourth output of said photodetector; two analog inverters having inputs connected respectively to the third and fourth outputs of said photodetector and having outputs connected respectively to signal inputs of the third and fourth analog switches; and an analog adder having four inputs connected respectively to outputs of the analog switches and having an output connected to the input of the track tracing unit.

* * * * *